(12) United States Patent
Boiko et al.

(10) Patent No.: US 10,370,945 B2
(45) Date of Patent: Aug. 6, 2019

(54) METHOD AND APPARATUS FOR ESTIMATING DOWN-HOLE PROCESS VARIABLES OF GAS LIFT SYSTEM

(71) Applicant: Khalifa University of Science and Technology, Abu Dhabi OT (AE)

(72) Inventors: Igor Boiko, Abu Dhabi (AE); Mohammad Luai Hammadih, Abu Dhabi (AE); Khalifa Hasan Al Hosani, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 543 days.

(21) Appl. No.: 15/093,954

(22) Filed: Apr. 8, 2016

(65) Prior Publication Data

US 2017/0292351 A1 Oct. 12, 2017

(51) Int. Cl.
*E21B 43/12* (2006.01)
*G05B 13/04* (2006.01)
*E21B 47/00* (2012.01)
*E21B 47/06* (2012.01)

(52) U.S. Cl.
CPC .......... *E21B 43/122* (2013.01); *G05B 13/041* (2013.01); *E21B 43/123* (2013.01); *E21B 47/0007* (2013.01); *E21B 47/06* (2013.01)

(58) Field of Classification Search
CPC ...... E21B 43/122; E21B 43/123; E21B 47/06; E21B 47/0007; G05B 13/041
See application file for complete search history.

(56) References Cited

U.S. PATENT DOCUMENTS

| | | | |
|---|---|---|---|
| 5,535,135 A | 7/1996 | Bush et al. | |
| 5,845,627 A | 12/1998 | Olin et al. | |
| 6,595,294 B1 * | 7/2003 | Dalsmo | E21B 43/122 |
| | | | 166/250.01 |
| 7,069,159 B2 | 6/2006 | Zima et al. | |
| 7,375,679 B1 | 5/2008 | Mookerjee et al. | |
| 7,908,112 B2 | 3/2011 | Nardi et al. | |
| 8,700,279 B2 | 4/2014 | Hansen et al. | |
| 8,706,333 B2 | 4/2014 | Li | |
| 8,890,484 B2 | 11/2014 | Mao et al. | |
| 9,007,260 B2 | 4/2015 | Rachlin et al. | |
| 9,010,180 B2 | 4/2015 | Petrovic et al. | |
| 9,097,798 B2 | 8/2015 | Martens et al. | |

(Continued)

OTHER PUBLICATIONS

Hussein, H., et al. "Design of gain scheduling control strategy for artificial gas lift in oil production through modified relay feedback test" J. Franklin Institute, vol. 352, pp. 5122-5144 (Aug. 2015) (Year: 2015).*

(Continued)

*Primary Examiner* — Jay Hann
(74) *Attorney, Agent, or Firm* — Renner, Otto, Boisselle & Sklar, LLP

(57) ABSTRACT

A method and apparatus for estimating a down-hole annulus pressure, and/or a down-hole tubing pressure, and/or a down-hole lift gas rate through a gas injection valve of gas lift system, which comprises at least one gas lift choke and at least one gas injection valve and at least one production choke. A state estimator is proposed to obtain the values of these down-hole process variables. The estimator contains a number of local estimators and an interpolation module.

13 Claims, 2 Drawing Sheets

(56) References Cited

U.S. PATENT DOCUMENTS

| | | |
|---|---|---|
| 9,168,924 B2 | 10/2015 | Lee et al. |
| 9,222,237 B1 | 12/2015 | Green et al. |
| 9,239,229 B2 | 1/2016 | Xalter et al. |
| 9,281,686 B2 | 3/2016 | Britton |
| 9,951,601 B2 * | 4/2018 | Rashid .................. E21B 43/122 |

OTHER PUBLICATIONS

Jahanshahi, E. & Skogestad, S. "Comparison between nonlinear model-based controllers and gain-scheduling Internal Model Control based on identified model" 52nd IEEE Conf. on Decision & Control, pp. 853-860 (2013) (Year: 2013).*

Aamo, O., et al. "Observer Design for Multiphase Flow in Vertical Pipes with Gas-Lift—theory and experiments" J. Process Control, vol. 15, pp. 247-257 (2005) (Year: 2005).*

O.M. Aamo, G.O. Eikrem, H.B. Siahaan, and B.A. Foss, "Observer design for multiphase flow in vertical pipes with gas-lift—theory and experiments," *Journal of Process Control*, Elsevier, 15(3), pp. 247-257, 2005.

J.M. Ali, N.H. Hoang, M.A. Hussain, and D. Dochain, "Review and classification of recent observers applied in chemical process systems," *Journal of Computers and Chemical Engineering*, Elsevier, 76, pp. 27-41, 2015.

D.A. Govorkov, I.G. Solovyev, and V.V. Fomin, "Real-time adaptive observer technology of an oil-well hydrodynamic deep states," *Proc. IEEE Conf. on Modern Technique and Technologies*, Tomsk, Russia, pp. 100-104, 2008.

M.L. Hammadih, K. Al Hosani, and I. Boiko, "Design of a gain matrix for a sliding mode observer for an artificial gas lift system," *International Workshop on Recent Advances in Sliding Modes*, Istanbul, Turkey, pp. 1-6, 2015.

M.L. Hammadih, K. Al Hosani, and I. Boiko, "Interpolating sliding mode observer for a ball and beam system," *International Journal of Control*, 10.1080/00207179.2016.1161235, 2016.

H. Hussein, A. Al-Durra, and I. Boiko, "Design of gain scheduling control strategy for artificial gas lift in oil production through modified relay feedback test," *Journal of the Franklin Institute*, 352 (11), pp. 5122-5144, 2015.

Jahanshahi, K. Salahshoor, and Y. Sahraie, "Application of fuzzy observer and controller in gas-lifted oil wells," *Proc. IEEE Conf. on Networking, Sensing and Control*, Sanya, China, pp. 101-106, 2008.

K. Jepsen, L. Hansen, C. Mai, and Z. Yang, "Emulation and control of slugging flows in a gas-lifted offshore oil production well through a lab-sized facility," *Proc. IEEE Conf. on Control Applications*, Hyderabad, India, pp. 906-911, 2013.

A. Nikoofard, T.A. Johansen, and G.O. Kaasa, "Design and comparison of adaptive estimators for under-balanced drilling," *Proc. American Control Conference*, Oregon, U.S., pp. 5681-5687, 2014.

F. Scibilia, M. Hovd, and R.R. Bitmead, "Stabilization of gas-lift oil wells using topside measurements," *Proc. 17th IFAC World Congress*, Seoul, South Korea, pp. 13907-13912, 2008.

J. Zhou, G.O. Eikrem, and O.M. Aamo, "Nonlinear observer-based control of unstable wells," *Proc. 3rd Symposium on Communications, Control and Signal Processing*, St. Julian's, Malta, pp. 683-688, 2008.

M.L. Hammadih, K. Al Hosani, and I. Boiko, "Soft sensing in deep wells within artificial gas lift technology," *SPE 31st Abu Dhabi International Petroleum Exhibition and Conference,* Abu Dhabi, United Arab Emirates, 10.2118/177731-MS, 2015.

* cited by examiner

METHOD AND APPARATUS FOR ESTIMATING DOWN-HOLE PROCESS VARIABLES OF GAS LIFT SYSTEM

FIELD OF INVENTION

The present invention relates to systems and methods for state estimation of down-hole parameters in gas lift systems associated with oil and gas drilling operations.

BACKGROUND OF THE INVENTION

Referring to portions of FIG. 1, in an artificial gas lift system (16), gas flows through a gas lift choke (4) and into an annulus (5). A gas injection valve (6) is placed at the deepest feasible point in a well. The gas injection valve is a check valve allowing the flow of gas only in one direction from an annulus (5) to a tubing (3), when the down-hole pressure in an annulus (5) is higher than in a tubing (3). This gas mixes with oil, which reduces the density of this mixture, so it results in the reduction of the well head. If a well is dead, it will start flowing as a result of the pressure differential between a reservoir (2) and the well head. As the head pressure become smaller, this create a pressure differential and the oil starts flowing upwards toward a production choke (7).

The biggest drawback in this system is the possibility of slug which is characterized by the intermittent type of gas flow, which can be also seen as instability of the gas lift system. Slug is the most detrimental effect to the performance of the control system, to oil production, and to the functionality of equipment.

The down-hole measurements are very difficult, however, and it would be very beneficial for the control purpose to have more accurate down-hole information. As a result, in some prior art systems state estimators are used to estimate the down-hole process variables from available measurements. A state estimator is an auxiliary dynamical system that provides estimates of process variables which are difficult or impossible to measure. There are quite a number of realizations of state estimators for a gas lift system that are available in literature. Aamo et al. (2005) proposed a nonlinear reduced-order observer for estimating the down-hole pressure, and combined it with a conventional proportional-integral (PI) controller. In the observer design, the states are taken as the masses of gas and liquid in the different volumes of the system. The mass of gas in the annulus is computed first from the measured surface pressures. For the estimation of the other two states, the pressure at the surface of both the annulus and the tubing are measured along with the flow through the production choke. Given the mass of gas in the annulus is a measured entity, the observer designed is dubbed a reduced-order observer, because it is not estimating all three states in the system.

Zhou et al. (2008) developed a nonlinear model for their system, which is an empirical model that qualitatively describes the behavior of the down-hole pressure, when there is severe slugging. A nonlinear observer in this case estimates the unmeasured down-hole states similar to Aamo et al. (2005). The controller in Zhou et al. (2008) is designed through an integrator back-stepping approach to eliminate the slugs in the fluctuating flow. In the proposed design, a parametrization for the states of the observer is required. The states of this model are taken as the down-hole pressure, its time derivative, and a variable proportional to the annulus-tubing differential pressure. The observer designed sees the down-hole pressure as the measured variable, and estimates the other two states accordingly. When pairing up the observer with a controller, Zhou et al. (2008) ensured global stability of the system along with transient performance. However, since this design depends on down-hole pressure measurements it is considered not feasible.

Jepsen et al. (2013) used a similar approach, where a simple nonlinear model is derived and verified by a laboratory setup. For this model an observer-based state feedback control is designed. The controller manipulates the opening of the production valve, based on pressure values returned and measured on the surface. In this case, the states are the masses of gas and liquid in the system. The presented laboratory setup includes a small scale 3 meters long PVC pipeline representing the tubing, a variable speed pump for the reservoir, and an air buffer tank connected to the tubing through a compressor to provide the required pressure. Comparing the simulation results from the nonlinear model developed with those from the experimental setup, the authors gave a benchmark for their work. Another control method developed by Jepsen et al. (2013) is for the nonlinear model, which is based on a linear observer. This is done through linearization of the original nonlinear model. In model linearization, an opening of the valve was taken at which both the measurements and the simulation results showed unstable behavior. This allows for the controlled system to reach stability in the most unstable regions of its operations. When designing the linear observer, the authors used the pole placement method. Jepsen et al. (2013) is one of the very few studies that consider the system from both a nonlinear and linear perspective.

Nikoofard et al. (2014) designed and compared different types of observers. The mathematical model designed was based on a lumped-parameter low-order model, where the states are the masses of gas and liquid in the different volumes. The first observer designed is a Lyapunov-based adaptive observer, which is a full-order observer for the states in the system; this is a conventional observer design method. The second observer designed is the Recursive Least Squares estimator. For this estimator the initial estimation error covariance is taken with large values; this leads to high correction vectors and therefore to a fast convergence of the states. Finally a Joint Unscented Kalman filter is introduced, using the Gaussian distribution; the filter estimates the average and covariance matrices for the estimation error with a few sample set points. When comparing these three methods, the authors noted that RLS has the best performance for parameter estimation while it has a lower measurement noise covariance. The adaptive observer has a better performance when it comes to parameter estimation while the measurement noise covariance is high.

Prior systems also include a real-time adaptive nonlinear observer for the estimation and control of an oil well hydrodynamic deep states by Govorkov et al. (2008), a fuzzy observer and controller in gas-lifted oil wells by Jahanshahi et al. (2008), and a high gain observer by Scibilia et al. (2008). Ali et al. (2015) provided a review on the applications of recent observers to chemical process systems and classified them into six classes.

U.S. Pat. No. 5,535,135 (1996) of Kevin J. Bush, et al. discloses a method and a system for measuring a chemical concentration of a gas exhausted from exhaust ports of a multi-cylinder internal combustion engine based on a Kalman-Bucy state estimator. The disclosed method and system claim compensation for the static and dynamic temporal and special effects characteristic of the multi-cylinder engine exhaust system and improvement of sensory response to rich and lean exhaust gases.

U.S. Pat. No. 5,845,627 (1998) of Peter M. Olin, et al. discloses a pneumatic state estimator for estimating gas flow and pressure at pneumatic nodes and flow branches within a reticulated engine system for engine control and diagnostic operations resolving net flow imbalances at specific pneumatic nodes and attributes.

U.S. Pat. No. 7,069,159 B2 (2006) of Marek Zima, et al. discloses a method, a computer program and a system for estimating a state of a large-scale electric power transmission network. The disclosed system claims that the invention can work completely independent of and redundant to existing SCADA systems.

U.S. Pat. No. 7,375,679 (2008) of Purusottam Mookerjee, et al. discloses a reduced state estimation with biased and out-of-sequence measurements from multiple sensors. The disclosure relates to the tracking of moving targets by multiple sensors, with different measurement bias for each sensor and feeding these measurements into a central processing site, possibly with different time delays. The disclosed process claims providing a computationally efficient recursive algorithm for optimally estimating the state of a system, using the criterion of minimizing the mean-square total error.

U.S. Pat. No. 7,908,112 B2 (2011) of Flavio Nardi, et al. discloses a system and method for estimating vehicle lateral velocity that defines a relationship between front and rear axle lateral forces and front and rear axle side-slip angles. The disclosed method claims providing an estimated vehicle lateral velocity using the selected virtual lateral velocity through the use of a closed loop Luenberger observer with a kinematic relationship between the lateral velocity and standard sensor measurements for lateral acceleration, yaw-rate and vehicle longitudinal velocity.

U.S. Pat. No. 8,700,279 B2 (2014) of R. A. Hansen, et al. discloses a method for optimizing a shift event in a vehicle which includes designating a clutch to be used as an oncoming clutch or an offgoing clutch in the shift event before executing the shift event, and processing a plurality of input values through a linear state observer to thereby determine, as an output value of the state observer, an estimated slip speed of the designated clutch. The disclosed method includes using a proportional-integral control module for the designated clutch to close the control loop on the estimated slip speed from the state observer, thereby smoothing a switching between state space equation in the state observer, and executing the shift event.

U.S. Pat. No. 8,706,333 B2 (2014) of Yonghua Li, discloses a method for controlling an electric vehicle including an internal combustion engine, a battery having a state of charge (SOC) and an open circuit voltage (OCV). The disclosed method includes establishing a system for estimating battery state of charge. The system includes an open circuit voltage estimation subsystem including an adaptive observer for estimating battery open circuit voltage based on a previous estimate of battery open circuit voltage.

U.S. Pat. No. 8,890,484 B2 (2014) of Xiaofeng Mao, et al. discloses a battery state of charge (SOC) estimator using a robust linear time invariant infinity observer, when connected to a plurality of loads.

U.S. Pat. No. 9,007,260 B2 (2015) of Yaron Martens, et al. discloses a method and apparatus for estimating and compensating for a broad class of non-Gaussian sensor and process noise. A coded filter combines a dynamic state estimator (for example, a Kalman filter) and a nonlinear estimator to provide approximations of the non-Gaussian process and sensor noise associated with a dynamic system. These approximations are used by the dynamic state estimator to correct sensor measurements or to alter the dynamic model governing evolution of the system state. The disclosed method and apparatus is used to estimate the position of a navigator. The coded filter leverages compressive sensing techniques in combination with error models based on concepts of compressibility and the application of efficient convex optimization processes.

U.S. Pat. No. 9,010,180 B2 (2015) of Simon Petrovic, et al. discloses a method and an observer for determining the exhaust manifold temperature in a turbocharged engine upstream of the turbine. The method comprises estimating a value of the exhaust manifold temperature based on a model, measuring a temperature downstream of the turbine, and correcting the value of the exhaust manifold temperature based on the measurement. The disclosed method claims enabling a sufficiently fast, accurate and robust determination of the exhaust manifold temperature with reduced effort and costs.

U.S. Pat. No. 9,097,798 B2 (2015) of Christopher J. Martens, et al. discloses a method and system for determining the position of a user device which can receive data signals from orbiting space vehicles. These data signals can be used for positioning calculation and/or track maintenance of the user device. The disclosed method and system relates to satellite navigation and estimating the position of fixed or moving user devices using an extended Kalman filter (EKF) state estimator for the track maintenance of the user device, based on tracking the changing positing of the user device.

U.S. Pat. No. 9,168,924 B2 (2015) of Jin-Woo Lee, et al. discloses a lane controller system installed on a host vehicle which may include components for self-diagnosing malfunctions on the vehicle. The disclosed system may include a vehicle state estimator for estimating the state of the vehicles. The disclosed system claims that the vehicle state estimator provides data to a path predicator for predicting the path that the vehicle is following, which is then used to correct the steering applied by the steering controller to the electrical power steering (EPS), or active front steering (AFS), or individual wheel brakes.

U.S. Pat. No. 9,222,237 B1 (2015) of Francisco R. Green, et al. discloses a weighted state estimator for controlling the position of an earthmoving equipment, which typically have a hydraulically controlled earthmoving implement, that can be manipulated by a joystick or other means in an operator control station of the machine. The implement state estimator generates an implement state estimate using Kalman filter that is based at least partially on (i) implement position signals from an implement angular rate sensor and an implement accelerometer, (ii) signals from the translational chassis movement indicator and the implement inclinometer, and (iii) one or more weighting factors representative of noise in the signals from the translational chassis movement indicator and the implement inclinometer.

U.S. Pat. No. 9,239,229 B2 (2016) of Stefan Xalter, et al. discloses a method and device for monitoring multiple mirror arrays in an illumination system of microlithographic projection exposure apparatus. The system also includes an instrument to provide a measurement signal, and a model-based state estimator configured to compute, for each element, an estimated state vector based on the measurement signal. The estimated state vector represents: a deviation of a light beam caused by the element; and a time derivative of the deviation. The disclosed system claims the suitability of using Kalman filter, the extended Kalman filter (EKF), the unscented Kalman filter (UKF) or the particle filter for state estimation.

U.S. Pat. No. 9,281,686 B2 (2016) of Jay P. Britton discloses a state estimation for cooperative electrical grids which is based on a local grid model and local electrical grid information. The local state estimation can reflect interactions and interconnections with other electrical grids by determining state estimation solution information based on the local grid model, local electrical grid information, and remote state estimator solution information associated with the other electrical grid. As such, a local state estimator can be configured to receive and employ remote state estimator solution information. This can be in addition to the model conventional technique or receiving a remote grid model and remote electrical grid information to estimate the conditions of the remote electrical grid. The disclosed method claims that state estimation solution information can be incremental to further reduce the amount of information to be transferred and the time needed to accomplish transmission of the information.

CITED DOCUMENTS

U.S. Patent Documents

| | | | |
|---|---|---|---|
| 5,535,135 | July 1996 | Bush et al. | 364/496 |
| 5,845,627 | December 1998 | Olin et al. | 123/676 |
| 7,069,159 B2 | June 2006 | Zima et al. | 702/57 |
| 7,375,679 B1 | May 2008 | Mookerjee et al. | 342/195 |
| 7,908,112 B2 | March 2011 | Nardi et al. | 702/142 |
| 8,700,279 B2 | April 2014 | Hansen et al. | 701/67 |
| 8,706,333 B2 | April 2014 | Li | 701/22 |
| 8,890,484 B2 | November 2014 | Mao et al. | 320/152 |
| 9,007,260 B2 | April 2015 | Rachlin et al. | 342/357. |
| 9,010,180 B2 | April 2015 | Petrovic et al. | 73/114. |
| 9,097,798 B2 | August 2015 | Martens et al. | G01S 19/38 |
| 9,168,924 B2 | October 2015 | Lee et al. | B60W 30/12 |
| 9,222,237 B1 | December 2015 | Green et al. | E02F 3/845 |
| 9,239,229 B2 | January 2016 | Xalter et al. | G01B 11/002 |
| 9,281,686 B2 | March 2016 | Britton | 361/720 |

OTHER REFERENCES

O. M. Aamo, G. O. Eikrem, H. B. Siahaan, and B. A. Foss, "Observer design for multiphase flow in vertical pipes with gas-lift—theory and experiments," *Journal of Process Control*, Elsevier, 15(3), pp. 247-257, 2005.

J. Zhou, G. O. Eikrem, and O. M. Aamo, "Nonlinear observer-based control of unstable wells," *Proc. 3rd Symposium on Communications, Control and Signal Processing*, St. Julian's, Malta, pp. 683-688, 2008.

K. Jepsen, L. Hansen, C. Mai, and Z. Yang, "Emulation and control of slugging flows in a gas-lifted offshore oil production well through a lab-sized facility," *Proc. IEEE Conf. on Control Applications*, Hyderabad, India, pp. 906-911, 2013.

A. Nikoofard, T. A. Johansen, and G. O. Kaasa, "Design and comparison of adaptive estimators for under-balanced drilling," *Proc. American Control Conference*, Oregon, U.S., pp. 5681-5687, 2014.

D. A. Govorkov, I. G. Solovyev, and V. V. Fomin, "Real-time adaptive observer technology of an oil-well hydrodynamic deep states," *Proc. IEEE Conf. on Modern Technique and Technologies*, Tomsk, Russia, pp. 100-104, 2008.

E. Jahanshahi, K. Salahshoor, and Y. Sahraie, "Application of fuzzy observer and controller in gas-lifted oil wells," *Proc. IEEE Conf. on Networking, Sensing and Control*, Sanya, China, pp. 101-106, 2008.

F. Scibilia, M. Hovd, and R. R. Bitmead, "Stabilization of gas-lift oil wells using topside measurements," *Proc. 17th IFAC World Congress*, Seoul, South Korea, pp. 13907-13912, 2008.

J. M. Ali, N. H. Hoang, M. A. Hussain, and D. Dochain, "Review and classification of recent observers applied in chemical process systems," *Journal of Computers and Chemical Engineering*, Elsevier, 76, pp. 27-41, 2015.

H. Hussein, A. Al-Durra, and I. Boiko, "Design of gain scheduling control strategy for artificial gas lift in oil production through modified relay feedback test," *Journal of the Franklin Institute*, 352 (11), pp. 5122-5144, 2015.

M. L. Hammadih, K. Al Hosani, and I. Boiko, "Design of a gain matrix for a sliding mode observer for an artificial gas lift system," *International Workshop on Recent Advances in Sliding Modes*, Istanbul, Turkey, pp. 1-6, 2015.

M. L. Hammadih, K. Al Hosani, and I. Boiko, "Soft sensing in deep wells within artificial gas lift technology," *SPE 31st Abu Dhabi International Petroleum Exhibition and Conference*, Abu Dhabi, United Arab Emirates, 10.2118/177731-MS.

M. L. Hammadih, K. Al Hosani, and I. Boiko, "Interpolating sliding mode observer for a ball and beam system," *International Journal of Control*, 10.1080/00207179.2016.1161235.

SUMMARY OF THE INVENTION

The present invention is related to a state estimation system for down-hole process variables of a gas lift system eliminating the need for down-hole measurement. It is achieved through the use of multiple local estimators based on linear models and incorporation of the estimates produced by these local estimators into a single estimate. A multiple-model state estimator is used for estimation of down-hole process variables of a gas lift system. A state estimator provides estimated values of a down-hole annulus pressure, of a down-hole tubing pressure, and of a lift gas rate through a gas injection valve, in steady and transient modes. The system comprises N local state estimators and an interpolation module for incorporating estimated values provided by all local state estimators into a single estimate.

The concept of estimating down-hole process variables of gas lift system represents a number of inventive steps. The invention is able to accurately provide estimated values of a down-hole annulus pressure, and/or a down-hole tubing pressure, and/or a lift gas rate through a gas injection valve of gas lift system. The principle used within the invention is based on the assumption that a linearized model of the gas lift system, obtained through linearization at an equilibrium point, can provide sufficient accuracy if the actual process variables of the system take values in the vicinity of this equilibrium point. Through the use of linear models obtained for multiple equilibrium points, the operating range of process variables is covered. The realization of the estimator using this principle leads to a high computational efficiency.

DETAILED DESCRIPTION OF THE INVENTION

Figure 1:
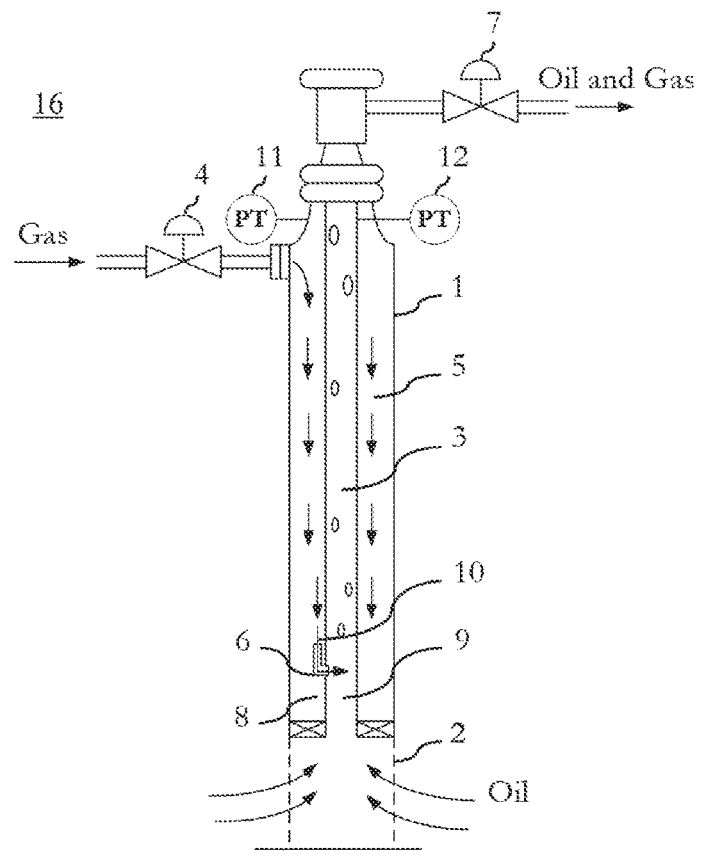
FIG. 1 shows a schematic of an artificial gas lift system with measurements of surface annulus pressure and surface tubing pressure.

FIG. 1 shows a schematic of an artificial gas lift system 16 comprising a well casing 1 which connects a surface equipment with an oil reservoir 2; a tubing 3 inserted inside said well casing 1 and forming a space between said well casing 1, and said tubing 3, hereafter referred to as an annulus 5; a gas lift choke 4 installed between a source of a high-pressure gas and said annulus 5, the gas lift choke is mounted on the gas injection flow-line for controlling the injection of lift gas; a gas injection valve 6 installed between said annulus 5 and a volume inside said tubing 3; and during normal operation the gas is usually injected at a deepest feasible point in a well; in this case an annulus 5 is filled with pressurized gas; a production choke 7 installed between a volume inside said tubing 3 and oil processing facilities above the surface, the production choke 7 is mounted in said tubing 3 for controlling the production rate; a gas-conduit may be equipped with a device for measurement of surface annulus pressure 11; and a well head may be equipped with a device for measurement of surface tubing pressure 12. Currently, measurement of a down-hole annulus pressure 8, of a down-hole tubing pressure 9, and of a lift gas rate (LGR) 10 are technically difficult to realize due to high pressures and impossibility to do proper calibration of these measurement devices. However, it is possible to estimate these quantities through surface measurements and properly designed algorithms.

Figure 2:
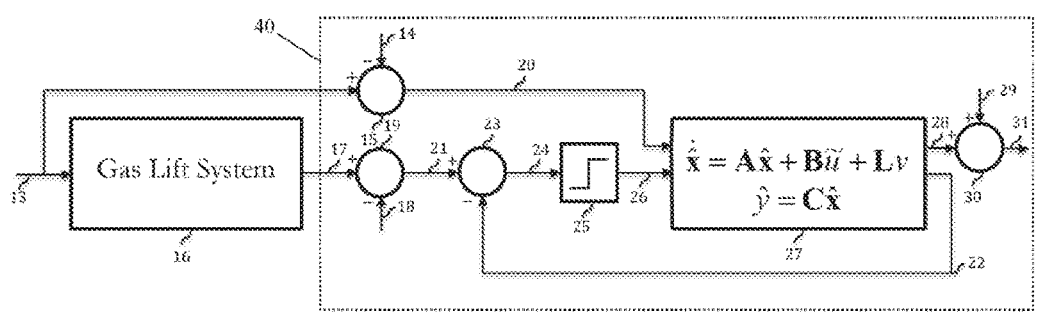
FIG. 2 shows a structure of a state estimator using measurements of surface annulus pressure and surface tubing pressure in a nonlinear model describing dynamics of an artificial gas lift system.

FIG. 2 shows a structure of a state estimation system 40 comprising a first adder 15, a second adder 19, a third adder 23, a nonlinear module 25, a linear module 27, and a fourth adder 30; using measurements of surface annulus pressure and surface tubing pressure in a nonlinear model describing dynamics of an artificial gas lift system. The first and second adders in particular each may include an electronic receiver configured to receive a plurality of input parameters measured at an upper end of the artificial lift system. A nonlinear control-oriented model of the gas lift system 16 was used along with the state estimator, which is given in the form of Ordinary Differential Equations (ODEs); the nonlinear model is derived based on mass balance equations in an annulus 5 and a tubing 3; based on this principle, the three states are the masses present in certain control volumes, the two control volumes in the model are an annulus 5 and a tubing 3; the masses considered are $m_{ga}$, $m_{gt}$, $m_{lt}$; where $m_{ga}$ is the mass of gas in an annulus 5, $m_{gt}$ is the mass of gas in a tubing 3, and $m_{lt}$ is the mass of liquid in a tubing 3, the dynamics of the state variables are modeled as follows:

$$\dot{m}_{ga} = w_{ga} - w_{gi}$$

$$\dot{m}_{gt} = w_{gi} - w_{gp}$$

$$\dot{m}_{lt} = w_{lr} - w_{lp}$$

Where $w_{ga}$ is the mass flow rate of gas into an annulus 5 through a gas lift choke 4, $w_{gi}$ is the mass flow rate of the injected gas from an annulus 5 into a tubing 3 through a gas injection valve 6, $w_{gp}$ is the mass flow rate of gas from a tubing 3 through a production choke 7, $w_{lr}$ is the mass flow rate of liquid (oil and water) from a reservoir 2 into a tubing 3 and $w_{lp}$ is the mass flow rate of liquid produced from a tubing 3 through a production choke 7; an algebraic equation describing the relation between the down-hole annulus pressure 8 and down-hole tubing pressure 9 and the mass flow rate of gas through the choke. One possible equation to be used is:

$$w_{ga} = A_{ga} c_{ga} P_m \sqrt{\frac{g\gamma}{RT_a}\left(\frac{2}{\gamma+1}\right)^{\frac{\gamma+1}{\gamma}}} \Psi\left(\frac{P_a}{P_m}\right)$$

Here, $w_{ga}$ is the mass flow rate of gas through the choke, $A_{ga}$ is the area of the valve's orifice, $c_{ga}$ is the discharge coefficient, g is the gravity, $\gamma$ is the isentropic coefficient of natural gas, R is the universal gas constant, $T_a$ is the temperature at the annulus, $\Psi$ is a flow function, $P_a$ is the surface annulus pressure, and $P_m$ is the pressure at the gas manifold; one possible equation for the mass flow rate of gas from the annulus into the tubing through the injection valve to be used is:

$$w_{gi} = A_{iv} c_{iv} P_{ai} \sqrt{\frac{g\gamma}{RT_a}\left(\frac{2}{\gamma+1}\right)^{\frac{\gamma+1}{\gamma}}} \Psi\left(\frac{P_{ti}}{P_{si}}\right)$$

Here, $w_{gi}$ is the mass flow rate of gas from the annulus into the tubing through the injection valve, $A_{iv}$ is the area of the valve's orifice, $c_{iv}$ is the discharge coefficient, g is the gravity, $\gamma$ is the isentropic coefficient of natural gas, R is the universal gas constant, $T_a$ is the temperature at the annulus, $\Psi$ is a flow function, $P_{ti}$ is the down-hole tubing pressure, and $P_{ai}$ is the down-hole annulus pressure.

An algebraic equation describes the relation between the down-hole annulus pressure 8 and down-hole tubing pressure 9 and the mass flow rate of liquid from the reservoir into the tubing through the perforations valve. One possible equation to be used is:

$$w_{lr} = \rho_l N_{lr} A_{lr} c_{lr} \sqrt{\frac{P_r - P_{ti}}{g_l}}$$

Here, $\rho_l$ is the density of the liquid (oil), $A_{lr}$ is the equivalent area of the total orifice available for oil flow, $c_{lr}$ is the discharge coefficient, $N_{lr}$ is a constant added for units conversion, $g_l$ is the specific gravity of the liquid, $P_r$ is a constant pressure in the reservoir, and $P_{ti}$ is the down-hole tubing pressure.

$$w_{lp} = \frac{q_{mp} \rho_m}{\lambda + 1},$$

where $$q_{mp} = N_{pc} A_{pc} c_{pc} \sqrt{\frac{P_p - P_s}{g_m}}$$

-continued $$\rho_m = \frac{\lambda+1}{\lambda\frac{RT_t}{P_p\mu}+\frac{1}{\rho_l}}$$

$$g_m = \frac{\rho_m}{\rho_{water}}$$

$$\lambda = \frac{m_{gt}}{m_{lt}}$$

Here, $\rho_m$ is the density of the mixture (oil and gas), $q_{mp}$ is the volumetric flow of the mixture, R is the universal gas constant, $T_t$ is the temperature in the tubing, $\mu$ is the molar mass of the gas, $g_m$ is the specific gravity of the mixture, and $\lambda$ is the ratio of the mass of gas to the mass of liquid in the tubing, $P_p$ is the surface tubing pressure, and $P_s$ is the pressure at the output to the production choke. An algebraic equation for the mass flow of gas through the production valve is computed from the mixture flow and a known ratio $\lambda$:

$$w_{gp} = \lambda w_{lp}$$

The flow function $\Psi$ used for compressible fluid of the gas lift system is given by:

$$\Psi\left(\frac{P_r}{P_s}\right) = \begin{cases} 1 & \text{if } \frac{P_r}{P_s} \leq \beta_c \\ \sqrt{\frac{2}{\gamma-1}\left(\frac{\gamma+1}{2}\right)^{\frac{\gamma+1}{\gamma-1}}}\sqrt{\left(\frac{P_r}{P_s}\right)^{\frac{2}{\gamma}} - \left(\frac{P_r}{P_s}\right)^{\frac{\gamma+1}{\gamma}}} & \text{if } \frac{P_r}{P_s} \geq \beta_c \end{cases}$$

Here, $$\beta_c = (2/\gamma + 1)^{\frac{\gamma}{\gamma-1}}$$

is the critical pressure ratio, $P_s$ is the pressure inside the volume the gas is leaving and the pressure $P_r$ signifies the pressure inside the volume the gas is entering. The mass flow rate functions depends on the pressure. The pressure distribution in the well is described in Hussein et al. (2015) by the flowing set of mass dependent nonlinear functions:

$$P_p = \frac{m_{mix}g}{A_t\left(e^{\frac{ah}{b}-\frac{m_{mix}g}{Ab}}-1\right)}$$

$$P_{ti} = \frac{m_{mix}ge^{\frac{ah}{b}-\frac{m_{mix}g}{Ab}}}{A_t\left(e^{\frac{ah}{b}-\frac{m_{mix}g}{Ab}}-1\right)}$$

$$P_a = \frac{m_{ga}g}{A_a\left(e^{\frac{g\mu}{RT_a}h}-1\right)}$$

$$P_{ai} = \frac{m_{ga}ge^{\frac{g\mu}{RT_a}h}}{A_t\left(e^{\frac{g\mu}{RT_a}h}-1\right)}$$

Here, $a=g(\lambda+1)\rho_l$, $b=\lambda RT_t\rho_l/\mu$, h is the height of a tubing 3, $A_t$ is the cross-sectional area of a tubing 3, $T_t$ is the temperature in a tubing 3, $\mu$ is the molar mass, $T_a$ is the temperature in an annulus 5, and $A_a$ is the cross-sectional area of an annulus 5. The first two pressure equations depict a tubing pressure based on mass mixture of gas and liquid $m_{mix}$, where $P_p$ is a surface tubing pressure 12, and $P_{ti}$ is a down-hole tubing pressure 9. The last two pressure equations represent an annulus pressure based on mass of gas $m_{ga}$, where $P_a$ is a surface annulus pressure 11, and $P_{ai}$ is a down-hole annulus pressure 8.

A generic nonlinear model of a gas lift system is given as follows:

$$\dot{x} = f(x,u)$$

$$y = g(x,u)$$

Here, $x = [x_1 \; x_2 \; x_3]$ is a state vector comprised of the state variables $x_1 = m_{ga}$, $x_2 = m_{gt}$, $x_3 = m_{lt}$, $y = [y_1 \; y_2]^T$ is the output vector comprised of two measured process variables $y_1 = P_a$ is a surface annulus pressure, $y_2 = P_p$ is a surface tubing pressure and $u = [u_1 \; u_2]$ is a control vector comprised of the controller commands defining the required value openings: $u_1 = l_1$ is a gas lift choke opening, $u_2 = l_2$ is a production choke opening. The process variables available for measurement are the surface flow and surface pressures. Down-hole flow, down-hole pressure, and down-hole masses of a gas lift system can only be estimated using a state estimator. The use of a state estimator 50 would eliminate the necessity of down-hole state measurements that are considered difficult to achieve due to the harsh environment associated, which include limited accessibility and high down-hole pressures.

Figure 4:
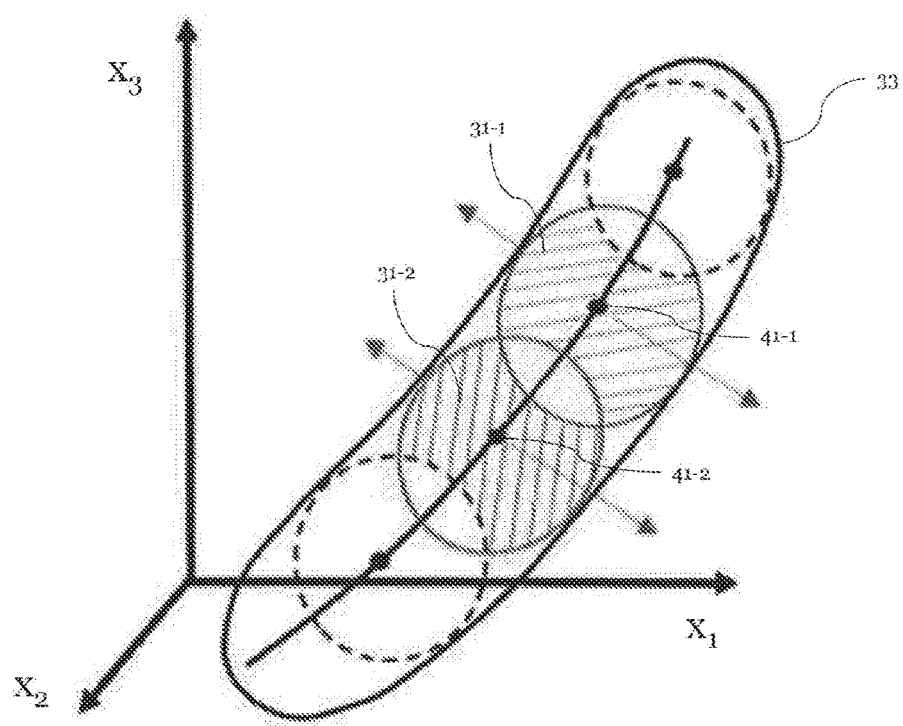
FIG. 4 shows an illustration of an exemplary single estimate comprising N reference points and their respective estimates around said reference points.

Gas and liquid dynamics in an artificial gas lift are described by a third order nonlinear equation along with the dynamics of an actuator, valves, and controllers. These dynamics result in a high order nonlinear system with delays, which is very complex to analyze and control. Linearization of a nonlinear process at specific points provides a linear approximation of the process dynamics at these points. Therefore, the approach we propose involves linearization of a gas lift system in multiple selected operating points. A real physical system cannot reveal arbitrary combinations of the states, due to various physical constraints. Consequently, all system's state trajectories are concentrated within a specific boundary in the state space. The state corresponding to an equilibrium point is given by $x_o := \{x | 0 = f(x, u_o)\}$, which is created artificially by setting the control signal to the plant to a specific constant value given as $u_o$. Through varying these constant control inputs, various (multiple) equilibrium points are enforced. All system motions that occur in practice belong to a domain around a specific equilibrium point. If the state trajectory moves closer to another equilibrium point, this new equilibrium point can be considered as a new reference with its own domain. Each domain can be described by a certain linearized model obtained by linearization of the original nonlinear equations at a specific equilibrium point. As a result, as it is shown in FIG. 4, a set of state estimators for deviations 31-1, 31-2 from a specific equilibrium point 41-1, 41-2, based on linearized models with linearization at these specific equilibrium points, is designed. The steady state can be artificially obtained by means of setting a specific controller output. It can be assumed that a linearized model at a certain equilibrium point 41-1, 41-2 is valid in the vicinity of that specific equilibrium point. Therefore, a sliding mode observer is designed for each linear model, and then these estimators are incorporated in such a way that it provides proper estimation 33 for the original nonlinear system. Hammadih et al. (2015) proposed a design methodology for computing a gain matrix for each sliding mode observer for a gas lift system.

In the structure of a state estimation system 40, the first adder 15, the second adder 19 and the fourth adder 30 are used to enforce multiple equilibrium points 41. The state estimator 40 uses a $3^{rd}$ vector signal representative 13 containing a gas lift choke opening and a production choke opening of gas lift system 16 to calculate a $1^{st}$ vector signal representative 20 containing a deviation of a gas lift choke opening and a deviation of a production choke opening, by subtracting a $2^{nd}$ vector signal representative 14 containing a gas lift choke opening and a production choke opening about a reference point 41 of an i-th local estimator 40 from the $3^{rd}$ vector signal representative 13; along with a $6^{th}$ vector signal representative 17 containing a measured surface annulus pressure and a measured surface tubing pressure from gas lift system 16 to calculate a $4^{th}$ vector signal representative 21 containing a deviation of a surface annulus pressure and a deviation of a surface tubing pressure, by subtracting a fifth vector signal representative 18 containing a surface annulus pressure and a surface tubing pressure about a reference point 41 of an i-th local estimator 40 from the $6^{th}$ vector signal representative 17.

Figure 3:
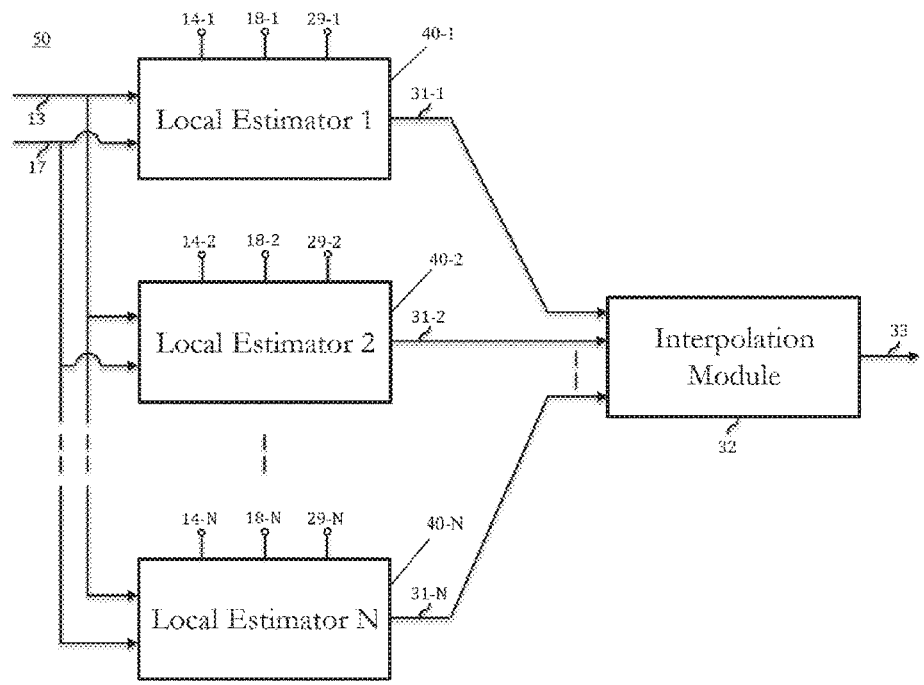
FIG. 3 shows an illustration of interpolation based on selection of two estimates and computation of a single estimate.

FIG. 3 shows an illustration of interpolation comprising N local estimators 40-1-40-N and an interpolation module 32 that incorporates estimates 31-1 provided by local estimator 1, 31-2 provided by local estimator 2, up to 31-N provided by local estimator N; and produces a single estimate 33 through the use of the interpolation module 32 based on a selection of two estimates and computation of a single estimate.

The single estimate may be determined using the following steps: selection of two local estimators with reference points closest to the current operating point of a gas lift system, computation of said single estimate from said two estimates based on the closeness of the actual operating point to reference points of these said two estimates; wherein the computation of said single estimate is done per formula:

$$\hat{x}_f = \begin{cases} \hat{x}_i & \text{if } y \le r_i \\ \alpha \hat{x}_i + (1-\alpha)\hat{x}_{i+1} & \text{if } r_i < y \le r_{i+1} \\ \hat{x}_{i+1} & \text{if } y > r_{i+1} \end{cases}$$

where $\hat{x}_i$ is an estimate of an i-th local estimator, $\hat{x}_{i+1}$ is an estimate of an i-th+1 local estimator, $\hat{x}_f$ is a single estimate from all local estimators, $r_i$ is an i-th reference point of an i-th local estimator, $r_{i+1}$ is an i-th+1 reference point of an i-th+1 local estimator, $\alpha$ is an interpolation coefficient and $0<\alpha<1$, which preferably is equal to 0.3.

Hammadih et al. (2015) proposed the idea of using multiple linearized models in sliding mode observer design. The incorporation of the two estimates is based on the output measurement y. The main condition that governs the interpolation function is that the total sum of coefficients $\alpha_i$ and $\alpha_{i+1}$ is 1 and the total sum of coefficients $\beta_k$ and $\beta_{k+1}$ is 1. Provided that $\zeta=0.3$ where $\zeta \in [0,1]$, $\Delta_{1i}=y_1-r_{1i}$, $\Delta_{2(i+1)}=r_{1(i+1)}-y_1$, $\Delta_{1k}=y_2-r_2k$, and $\Delta_{2(k+1)}=r_{2(k+1)}-y_2$. When the set point is below 30% of the output range $y_1$ and below 30% of the output range $y_2$, the coefficients $\alpha_i$ and $\beta_k$ will account for the main contribution, while the contribution from the coefficients $\alpha_{i+1}$ and $\beta_{k+1}$ is zero. When the set point is below 30% of the output range $y_1$ and above 70% of the output range $y_2$, the coefficients $\alpha_i$ and $\beta_{k+1}$ will account for the main contribution, while the contribution from the coefficients $\alpha_{i+1}$ and $\beta_k$ is zero. When the set point is above 70% of the output range $y_1$ and below 30% of the output range $y_2$, the coefficients $\alpha_{i+1}$ and $\beta_k$ will account for the main contribution, while the contribution from the coefficients $\alpha_i$ and $\beta_{k+1}$ is zero. When the set point is above 70% of the output range $y_1$ and above 70% of the output range $y_2$, the coefficients $\alpha_{i+1}$ and $\beta_{k+1}$ will account for the main contribution, while the contribution from the coefficients $\alpha_i$ and $\beta_k$ is zero. When the output measurement lies exactly in the center of both ranges and between the four set points $r_{1i}$, $r_{1(i+1)}$, $r_{2k}$ and $r_{2(k+1)}$, the coefficients would have equal contribution. Consequently, the coefficients $\alpha_A$ and $\alpha_B$ are obtained as follows:

If $\dfrac{\Delta_{1i}}{r_{1(i+1)} - r_{1i}} \le \zeta$ and $\dfrac{\Delta_{1k}}{r_{2(k+1)} - r_{2k}} \le \zeta$, then $\alpha_i = 1$, $\alpha_{i+1} = 1 - \alpha_i$, $\beta_k = 1$ and $\beta_{k+1} = 0$ If $\dfrac{\Delta_{1i}}{r_{1(i+1)} - r_{1i}} \le \zeta$ and $\dfrac{\Delta_{1k}}{r_{2(k+1)} - r_{2k}} \ge (1-\zeta)$, then $\alpha_i = 1$, $\alpha_{i+1} = 1 - \alpha_i$, $\beta_k = 0$ and $\beta_{k+1} = 1$ If $\dfrac{\Delta_{1i}}{r_{1(i+1)} - r_{1i}} \ge (1-\zeta)$ and $\dfrac{\Delta_{1k}}{r_{2(k+1)} - r_{2k}} \le \zeta$, then $\alpha_i = 0$, $\alpha_{i+1} = 1 - \alpha_i$, $\beta_k = 1$ and $\beta_{k+1} = 1$ If $\dfrac{\Delta_{1i}}{r_{1(i+1)} - r_{1i}} \ge (1-\zeta)$ and $\dfrac{\Delta_{1k}}{r_{2(k+1)} - r_{2k}} \ge (1-\zeta)$, then $\alpha_i = 0$, $\alpha_{i+1} = 1 - \alpha_i$, $\beta_k = 0$ and $\beta_{k+1} = 1$ Else, $\alpha_i = \dfrac{\left((1-\zeta) - \dfrac{\Delta_{1i}}{r_{1(i+1)} - r_{1i}}\right)}{(1 - 2\zeta)}$, $\alpha_{i+1} = 1 - \alpha_i$, $\beta_k = \dfrac{\left((1-\zeta) - \dfrac{\Delta_{1k}}{r_{2(k+1)} - r_{2k}}\right)}{(1 - 2\zeta)}$ and $\beta_{k+1} = 1 - \beta_k$.

Then, the final estimation is selected based on the nearest distance to the specific sliding mode observer. In a preferred embodiment, the nonlinear model of the gas lift system 16 is linearized at specific linearization points. These points are assumed to comprise the whole operating range of the gas lift system. The resulting linearization provides linear approximation of the system at these equilibrium points. In the linearization of the model, the derivations of the linearized state space matrices of the nonlinear gas lift system are obtained using the Jacobian matrix approach in Hussein et al. (2015).

Linearization of the given generic nonlinear model of the gas lift system at the point $x_o$, $u_o$ yields:

$\dot{\tilde{x}} = A\tilde{x} + B\tilde{u}$ $\tilde{y} = C\tilde{x} + D\tilde{u}$ Here, where $\tilde{x}=x-x_o$, $\tilde{y}=y-y_o$, and $\tilde{u}=u-u_o$. Derivation of the four state space matrices A, B, C, and D was computed using the Jacobian matrix. The state matrix of the linear system is written in term of the three state variables $m_{ga}$, $m_{gt}$, $m_{lt}$, as the following:

$$A = \left.\dfrac{\partial f}{\partial x}\right|_p = \begin{bmatrix} \dfrac{\partial w_{ga}}{\partial m_{ga}} - \dfrac{\partial w_{gi}}{\partial m_{ga}} & \dfrac{\partial w_{ga}}{\partial m_{gt}} - \dfrac{\partial w_{gi}}{\partial m_{gt}} & \dfrac{\partial w_{ga}}{\partial m_{lt}} - \dfrac{\partial w_{gi}}{\partial m_{lt}} \\ \dfrac{\partial w_{gi}}{\partial m_{ga}} - \dfrac{\partial w_{gp}}{\partial m_{ga}} & \dfrac{\partial w_{gi}}{\partial m_{gt}} - \dfrac{\partial w_{gp}}{\partial m_{gt}} & \dfrac{\partial w_{gi}}{\partial m_{lt}} - \dfrac{\partial w_{gp}}{\partial m_{lt}} \\ \dfrac{\partial w_{lr}}{\partial m_{ga}} - \dfrac{\partial w_{lp}}{\partial m_{ga}} & \dfrac{\partial w_{lr}}{\partial m_{gt}} - \dfrac{\partial w_{lp}}{\partial m_{gt}} & \dfrac{\partial w_{lr}}{\partial m_{lt}} - \dfrac{\partial w_{lp}}{\partial m_{lt}} \end{bmatrix}$$

Where all the derivatives are computed using the formulas provided in Hussein et al. (2015).

The input matrix of the linear system is related to the control action which is the percentage of opening of the valve l. Using the Jacobian matrix, the matrix is given by:

$$B = \left.\frac{\partial f}{\partial u}\right|_p = \begin{bmatrix} \frac{\partial w_{ga}}{\partial l} - \frac{\partial w_{gi}}{\partial l} \\ \frac{\partial w_{gi}}{\partial l} - \frac{\partial w_{gp}}{\partial l} \\ \frac{\partial w_{lr}}{\partial l} - \frac{\partial w_{lp}}{\partial l} \end{bmatrix}$$

Where all the derivatives are computed using the formulas provided in Hussein et al. (2015).

The output matrix of the linear system is related to the flow of gas into the annulus $w_{ga}$. Thus, the matrix is given by:

$$C = \left.\frac{\partial y}{\partial x}\right|_p = \begin{bmatrix} \frac{\partial w_{ga}}{\partial m_{ga}} & \frac{\partial w_{ga}}{\partial m_{gt}} & \frac{\partial w_{ga}}{\partial m_{lt}} \end{bmatrix}$$

Where all the derivatives are computed using the formulas provided in Hussein et al. (2015).

The feedforward matrix of the linear system is given as follows:

$$D = \left.\frac{\partial y}{\partial u}\right|_p = \begin{bmatrix} \frac{\partial w_{ga}}{\partial l} \end{bmatrix}$$

Where all the derivatives are computed using the formulas provided in Hussein et al. (2015).

Using higher number of linearization points and acquiring higher number of linearized models result in a better (on average) approximation of the nonlinear system due to the smaller (on average) distances between the actual state vector and the value of the state vector at a nearest equilibrium point. The principle of interpolating sliding mode observer is introduced by Hammadih et al. (2016), which is applied in this case on a ball and beam system for estimation of the slope of the beam from the measurement of the ball position.

The state estimation system and the various components thereof, including each of the N local estimators, the referenced component adders and the linear and non-linear modules, and the interpolation modules, and like or related processing components, may be implemented as any suitable electronic control or processing device. Such components may constitute or include suitable hardware, firmware, and various combinations thereof. Such components further may include control circuitry that is configured to carry out overall functions and operations of the state estimator system. The control circuitry may include an electronic processor, such as a CPU, microcontroller or microprocessor. Among their functions, to implement the features of the present invention, the control circuitry and/or electronic processor may execute program code stored on a non-transitory computer readable medium, such as any conventional computer memory device. The computer code may be executed for determining and outputting the estimated values as described above. It will be apparent to a person having ordinary skill in the art of computer programming, and specifically in application programming for electronic control devices for oil well control, how to program the state estimator components to operate and carry out logical functions associated with the present invention. Accordingly, details as to specific programming code have been left out for the sake of brevity. Also, while the code may be executed by control circuitry in accordance with an exemplary embodiment, such computational functionality could also be carried out via dedicated hardware, firmware, software, or combinations thereof, without departing from the scope of the invention.

The processor devices further may include any suitable output devices for generating signals associated with the calculations. The output devices may comprise electronic circuitry or other processing devices comparably as described above, for outputting electronic signals associated with the calculated values, which may then be interpreted by additional downstream processing devices or interface devices (e.g., displays, speakers, and other visual, audio, tactile, and/or other sensory indicators). For example, the adders 30 may constitute output devices comparably as described above that output signals associated with the estimated values 31 for use by the interpolation module 32. Similarly, the interpolation module 32 may include output processor devices comparably as described above that generate output signals associated with the single estimate 33 for use by the other interface devices Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for determining down-hole process parameters for an artificial gas lift system, comprising the following steps:
measuring an annulus pressure and/or a surface tubing pressure of the gas lift system;
operating a state estimator to perform the steps of:
a) determining a vector signal representative of a gas lift choke opening value and/or a production choke opening value and/or a vector signal representative of the measured annulus pressure and/or the measured surface tubing pressure as input values;
b) providing a vector signal representative containing estimates of a down-hole annulus pressure about a reference point of an i-th local estimator, and/or a down-hole tubing pressure about a reference point of an i-th local estimator, and/or a lift gas rate through said gas injection valve about a reference point of an i-th local estimator by means of N local estimators where N is greater than or equal to two; and c) incorporating the estimates provided by all local estimators into a single estimate by means of an interpolation module to determine estimated values of a down-hole annulus pressure, and/or of a down-hole tubing pressure, and/or of a lift gas rate through said gas injection valve; and generating an output associated with the determined estimated values; and controlling the artificial gas lift system by using the outputted estimated values of a down-hole annulus pressure, and/or of a down-hole tubing pressure, and/or of a lift gas rate through said gas injection valve.

2. A state estimator system for determining down-hole process parameters for an artificial gas lift system, the artificial gas lift system comprising a well casing which connects a surface equipment with an oil reservoir; a tubing inserted inside said well casing and forming an annulus as a space between said well casing and said tubing; a gas lift choke installed between a source of a high-pressure gas and said annulus; a gas injection valve installed between said annulus and a volume inside said tubing; a production choke installed between a volume inside said tubing and oil processing facilities above the surface; the state estimator system comprising:

a) an electronic receiver configured to receive a plurality of input parameters measured at an upper end of the artificial lift system;

b) N local estimators where N is greater than or equal to two, each providing based on the plurality of input parameters an $11^{th}$ vector signal representative containing estimates of a down-hole annulus pressure about a reference point of an i-th local estimator, and/or a down-hole tubing pressure about the reference point of an i-th local estimator, and/or a lift gas rate through a said gas injection valve about the reference point of an i-th local estimator; and c) an interpolation module that incorporates estimates provided by all local estimators into a single estimate to determine estimated values of a down-hole annulus pressure, of a down-hole tubing pressure, and of a lift gas rate (LGR) through said gas injection valve, in steady and transient modes; based on the input parameters measured at the upper end of the artificial gas lift system; and d) an output device configured to generate an output associated with the determined estimated values to control the artificial gas lift system using the outputted estimated values of the down-hole annulus pressure, and/or of the down-hole tubing pressure, and/or of the LGR through said gas injection valve.

3. A state estimator system as recited in claim 2, wherein the parameters measured at the upper end of the artificial gas lift system comprise a vector signal representative of a gas lift choke opening value and/or a production choke opening value; and/or a vector signal representative of a measured annulus pressure and/or a measured surface tubing pressure.

4. A state estimator system as recited in claim 2, wherein N reference points are selected as equilibrium points in a nonlinear model describing dynamics of an artificial gas lift system, for selected values of a gas lift choke and a production choke.

5. A state estimator system as recited in claim 2, wherein each of N local estimators comprises a first adder, and/or a second adder, and/or a third adder, and/or a nonlinear module, and/or a linear module, and/or a fourth adder.

6. A state estimator system as recited in claim 5, wherein at least one of the N local estimators comprises the first adder, and wherein the first adder produces a $1^{st}$ vector signal representative containing a deviation of a gas lift choke opening and a deviation of a production choke opening, by subtracting a $2^{nd}$ vector signal representative containing a gas lift choke opening and a production coke opening about a reference point of an i-th local estimator from a $3^{rd}$ vector signal representative containing a gas lift choke opening and a production choke opening.

7. A state estimator system as recited in claim 5, wherein at least one of the N local estimators comprises the second adder, and wherein the second adder produces a $4^{th}$ vector signal representative containing a deviation of a surface annulus pressure and a deviation of a surface tubing pressure, by subtracting a $5^{th}$ vector signal representative containing a surface annulus pressure and a surface tubing pressure about a reference point of an i-th local estimator from a $6^{th}$ vector signal representative containing a measured surface annulus pressure and a measured surface tubing pressure.

8. A state estimator system as recited in claim 5, wherein at least one of the N local estimators comprises the third adder, and wherein the third adder produces a $7^{th}$ vector error signal representative by subtracting an $8^{th}$ vector signal representative containing an estimate of a deviation of a surface annulus pressure and an estimate of a deviation of a surface tubing pressure from a $4^{th}$ vector signal representative containing a deviation of a surface annulus pressure and a deviation of a surface tubing pressure.

9. A state estimator system as recited in claim 5, wherein at least one of the N local estimators comprises the nonlinear module, and wherein the nonlinear module further contains a relay nonlinearity, produces a $9^{th}$ vector control signal representative based on a said seventh vector error signal representative as per formula: $v_i = h \cdot \text{sign } e_i$ where $v_i$ is an i-th vector control signal, h is an amplitude of the relay, h=1 in a preferred embodiment, and $e_i$ is an i-th vector error signal.

10. A state estimator system as recited in claim 5, wherein at least one of the N local estimators comprises the linear module, and wherein the linear module realizes computation of a $10^{th}$ vector signal representative containing an estimate of a deviation of a down-hole annulus pressure, an estimate of a deviation of a down-hole tubing pressure and an estimate of a deviation of a lift gas rate through a said gas injection valve (6), according to equations: $\dot{\hat{x}} = A\hat{x} + B\tilde{u} + Lv$, and $\hat{y} = C\hat{x} + D\tilde{u}$, where $A \in R^{3 \times 3}$, $B \in R^{3 \times 3}$, $C \in R^{1 \times 3}$, and $D \in R^{3 \times 2}$ are matrices computed as $$A = \left.\frac{\partial f}{\partial x}\right|_p, B = \left.\frac{\partial f}{\partial u}\right|_p, C = \left.\frac{\partial y}{\partial x}\right|_p, \text{ and } D = \left.\frac{\partial y}{\partial u}\right|_p$$

where f is the right-hand side of the equation $\dot{x} = f(x,u)$ describing the dynamics of the gas lift system, y is a vector signal containing a deviation of a surface annulus pressure and a deviation of a surface tubing pressure, p is an i-th equilibrium point, $L \in R^{3 \times 2}$ is a matrix containing constant coefficients, $\hat{x}$ is a vector containing an estimate of a deviation of a down-hole annulus pressure, an estimate of a deviation of a down-hole tubing pressure and an estimate of a deviation of a lift gas rate through a said gas injection valve, $\tilde{u}$ is a vector containing a deviation of a controller command of a gas lift choke opening and a deviation of a controller command of a production choke opening.

11. A state estimator system as recited in claim 5, wherein at least one of the N local estimators comprises the fourth adder, and wherein the fourth adder produces an $11^{th}$ vector signal representative containing estimates of a down-hole annulus pressure about a reference point of an i-th local estimator, a down-hole tubing pressure about a reference point of an i-th local estimator, and a lift gas rate through a said gas injection valve about a reference point of an i-th local estimator, by adding a $10^{th}$ vector signal representative containing an estimate of a deviation of a down-hole annulus pressure, an estimate of a deviation of a down-hole tubing pressure and an estimate of a deviation of a lift gas rate through a said gas injection valve, and a $12^{th}$ vector signal representative containing a down-hole annulus pressure, a down-hole tubing pressure, and a lift gas rate through a said gas injection valve about a reference point of an i-th local estimator.

12. A state estimator system as recited in claim 2, wherein an interpolation module incorporates a said $11^{th}$ vector signal representative containing estimates of a down-hole annulus pressure about a reference point of an i-th local estimator, a down-hole tubing pressure about a reference point of an i-th local estimator, and a lift gas rate through a said gas injection valve about a reference point of an i-th local estimator, from all local estimators into a single estimate.

13. A state estimator system as recited in claim 12, wherein the interpolation module produces a single estimate based on the following steps;

Selection of two local estimators with reference points closest to the current operating point of a gas lift system, Computation of said single estimate from said two estimates based on the closeness of the actual operating point to reference points of these said two estimates;

wherein the computation of a said single estimate is done per formula:

$$\hat{x}_f = \begin{cases} \hat{x}_i \text{ if } y \le r_i \\ \alpha \hat{x}_i + (1-\alpha)\hat{x}_{i+1} \text{ if } r_i < y \le r_{i+1} \\ \hat{x}_{i+1} \text{ if } y > r_{i+1} \end{cases}$$

where $\hat{x}_i$ is an estimate of an i-th local estimator, $\hat{x}_{i+1}$ is an estimate of an i-th+1 local estimator, $\hat{x}_f$ is a single estimate from all local estimators, $r_i$ is an i-th reference point of an i-th local estimator, $r_{i+1}$ is an i-th+1 reference point of an i-th+1 local estimator, $\alpha$ is an interpolation coefficient and $0<\alpha<1$, which preferably is equal to 0.3.

* * * * *